US011502983B2

(12) United States Patent
Heikkinen et al.

(10) Patent No.: US 11,502,983 B2
(45) Date of Patent: Nov. 15, 2022

(54) REPLY INTERFACE WITH SELECTABLE STICKERS FOR MESSAGING SYSTEM

(71) Applicant: Snap Inc., Santa Monica, CA (US)

(72) Inventors: Christie Marie Heikkinen, Santa Monica, CA (US); Ranidu Lankage, Belmont, CA (US); David Phillip Taitz, Los Angeles, CA (US); Jeremy Baker Voss, Los Angeles, CA (US); David Whyte, Toronto (CA)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/946,131

(22) Filed: Jun. 8, 2020

(65) Prior Publication Data

US 2021/0385179 A1 Dec. 9, 2021

(51) Int. Cl.
*H04L 51/10* (2022.01)
*H04L 51/046* (2022.01)
*H04W 4/12* (2009.01)
*H04L 51/58* (2022.01)

(52) U.S. Cl.
CPC ............ *H04L 51/10* (2013.01); *H04L 51/046* (2013.01); *H04L 51/58* (2022.05); *H04W 4/12* (2013.01)

(58) Field of Classification Search
CPC ....... H04L 51/046; H04L 51/10; H04L 51/38; H04W 4/12
See application file for complete search history.

(56) References Cited

U.S. PATENT DOCUMENTS

| 7,890,876 B1* | 2/2011 | Mandelbaum ......... G06Q 10/10 715/744 |
| 10,659,405 B1* | 5/2020 | Chang .................... G06F 3/0481 |
| 2015/0222617 A1* | 8/2015 | Ebersman ............... G06F 40/30 726/4 |

(Continued)

FOREIGN PATENT DOCUMENTS

WO WO-2021252501 A1 12/2021

OTHER PUBLICATIONS

"Surprise?", [Online] Retrieved from the Internet: <URL: https://www.snap.com/en-US/news/post/surprise>, (Oct. 3, 2013), 1 pg.
Buscemi, Scott, "Snapchat introduces 'Stories', a narrative built with snaps", [Online] Retrieved from the Internet: <URL: https://9to5mac.com/2013/10/03/snapchat-introduces-stories-a-narrative-bullt-with-snaps/>, (Oct. 3, 2013), 2 pgs.

(Continued)

*Primary Examiner* — Jeong S Park
(74) *Attorney, Agent, or Firm* — Schwegman Lundberg & Woessner, P.A.

(57) ABSTRACT

Aspects of the present disclosure involve a system comprising a computer-readable storage medium storing a program and method for providing a reply interface with selectable stickers for sending in a message. The program and method provide for receiving, by a first device of a first user, a media content item provided by a second device of a second user; determining, in response to receiving the media content item, a set of stickers for displaying with the media content item; and displaying, by the first device, the media content item together with a first reply interface and a second reply interface for sending a reply message to the second device. The first reply interface includes the set of stickers, each of which is selectable by the first user for sending to the second device. The second reply interface includes an input box for sending message content to the second device.

16 Claims, 10 Drawing Sheets

(56) References Cited

U.S. PATENT DOCUMENTS

| | | | |
|---|---|---|---|
| 2015/0271119 A1* | 9/2015 | Goncalves | H04L 51/216 |
| | | | 709/206 |
| 2016/0210963 A1 | 7/2016 | Kim et al. | |
| 2017/0003155 A1 | 2/2017 | Shaffer | |
| 2017/0123637 A1* | 5/2017 | Hirakawa | G06T 1/0007 |
| 2017/0336948 A1 | 11/2017 | Chaudhri et al. | |
| 2017/0358117 A1* | 12/2017 | Goossens | H04L 51/10 |
| 2018/0018319 A1* | 1/2018 | He | H04L 51/046 |
| 2018/0083898 A1 | 3/2018 | Pham | |
| 2018/0091732 A1* | 3/2018 | Wilson | H04N 5/23219 |
| 2019/0140990 A1 | 5/2019 | Rabbat et al. | |
| 2020/0358725 A1* | 11/2020 | Scapel | G06V 40/164 |
| 2021/0126883 A1* | 4/2021 | Choi | G06F 3/0484 |

OTHER PUBLICATIONS

Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-taies/>, (Oct. 3, 2013), 2 pgs.

Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

"International Application Serial No. PCT/US2021/036419, International Search Report dated Sep. 29, 2021", 5 pgs.

"International Application Serial No. PCT/US2021/036419, Written Opinion dated Sep. 29, 2021", 4 pgs.

\* cited by examiner

US 11,502,983 B2

REPLY INTERFACE WITH SELECTABLE STICKERS FOR MESSAGING SYSTEM

TECHNICAL FIELD

The present disclosure relates generally to messaging applications, including providing stickers within messaging.

BACKGROUND

Messaging systems provide for the exchange of message content between users. For example, a messaging system allows a user to exchange message content (e.g., text, images) with one or more other users.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

A messaging system typically allow users to exchange content items (e.g., messages, images and/or video) with one another in a message thread. A messaging system may implement or otherwise work in conjunction with a sticker system configured to maintain a collection of stickers for use in messaging between users (e.g., friends).

The disclosed embodiments provide for a messaging client to display first and second reply interfaces for responding to a media content item (e.g., a message with media content, or a Story corresponding to a collection of media content) provided by another user (e.g., a friend). The first reply interface includes a set of a predefined number of stickers (e.g., 9 stickers), each of which is user-selectable for sending as a response to the media content item. For example, the set of stickers may be presented in a case where the viewing user has not opted in or otherwise selected an avatar for use within the messaging system. On the other hand, the second reply interface includes an input box (e.g., configured to receive text input) for sending message content as a response to the media content item. The set of stickers may be updated (e.g., in real time) based on text terms entered within the input box. By virtue of including both of the first and second reply interfaces as described herein, end users may be more encouraged to reply to media content items provided by other users (e.g., friends).

Figure 1:
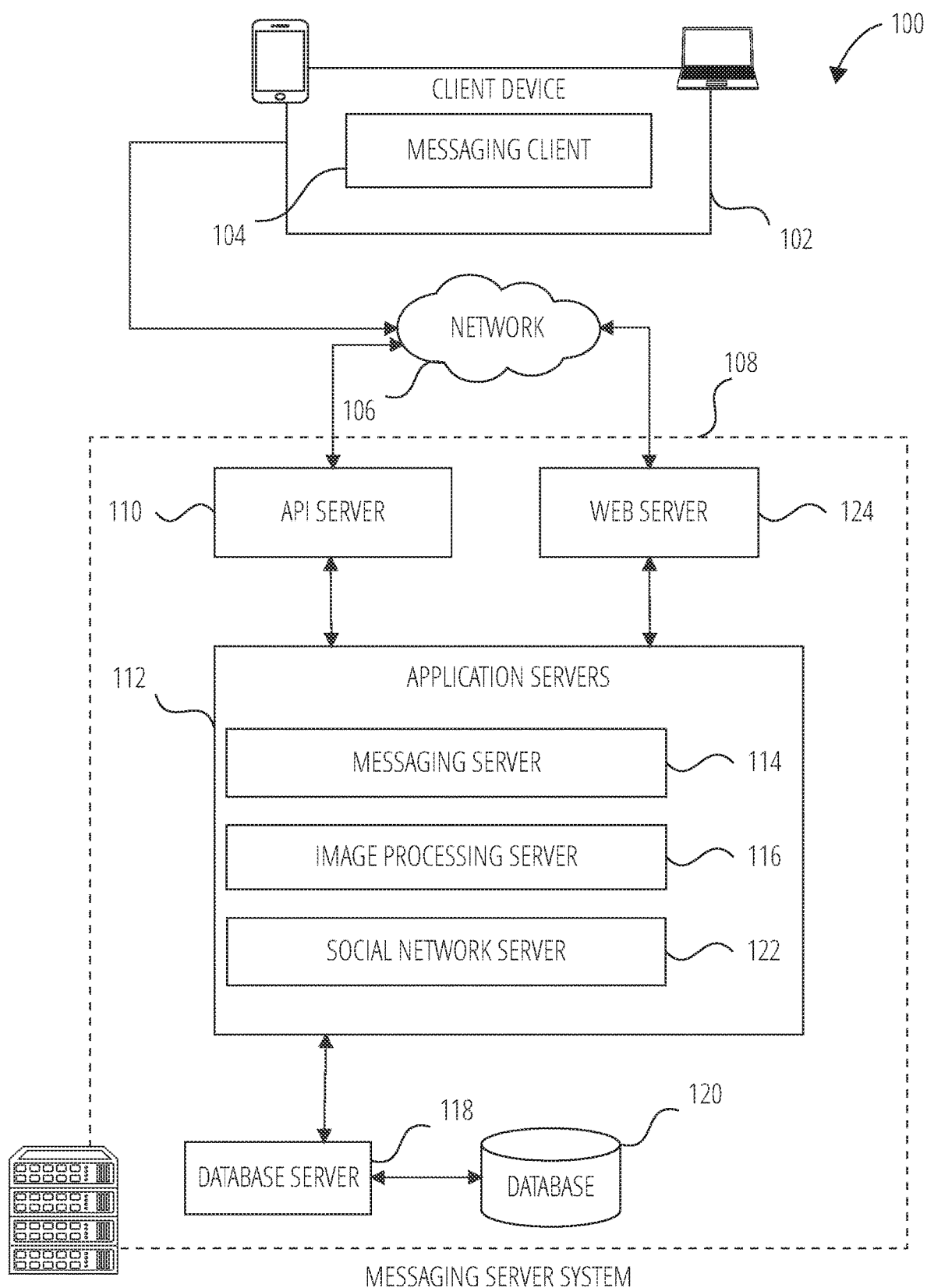
FIG. 1 is a diagrammatic representation of a networked environment in which the present disclosure may be deployed, in accordance with some example embodiments.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., Story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called Stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
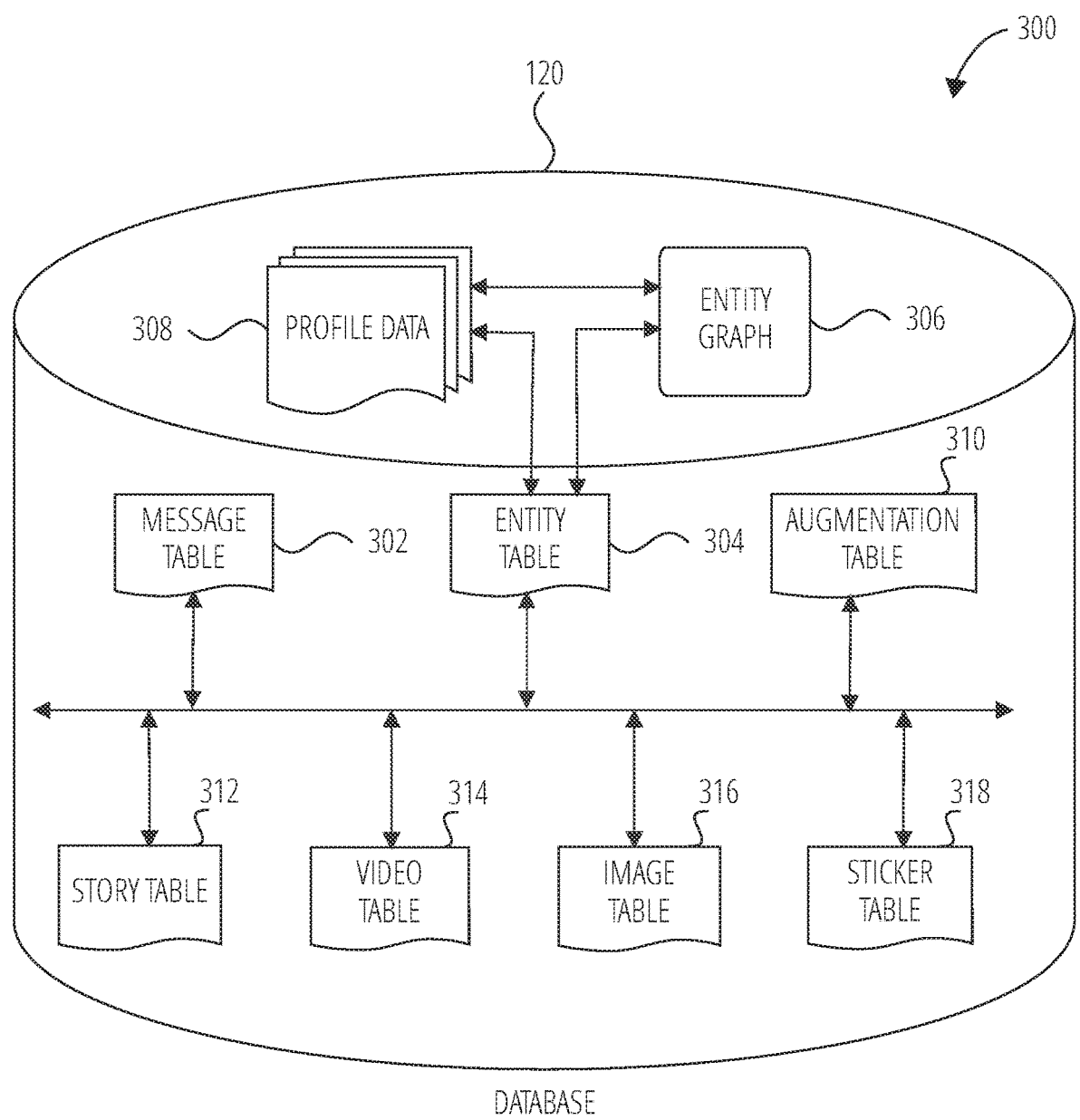
FIG. 3 is a diagrammatic representation of a data structure as maintained in a database, in accordance with some example embodiments.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

Figure 2:
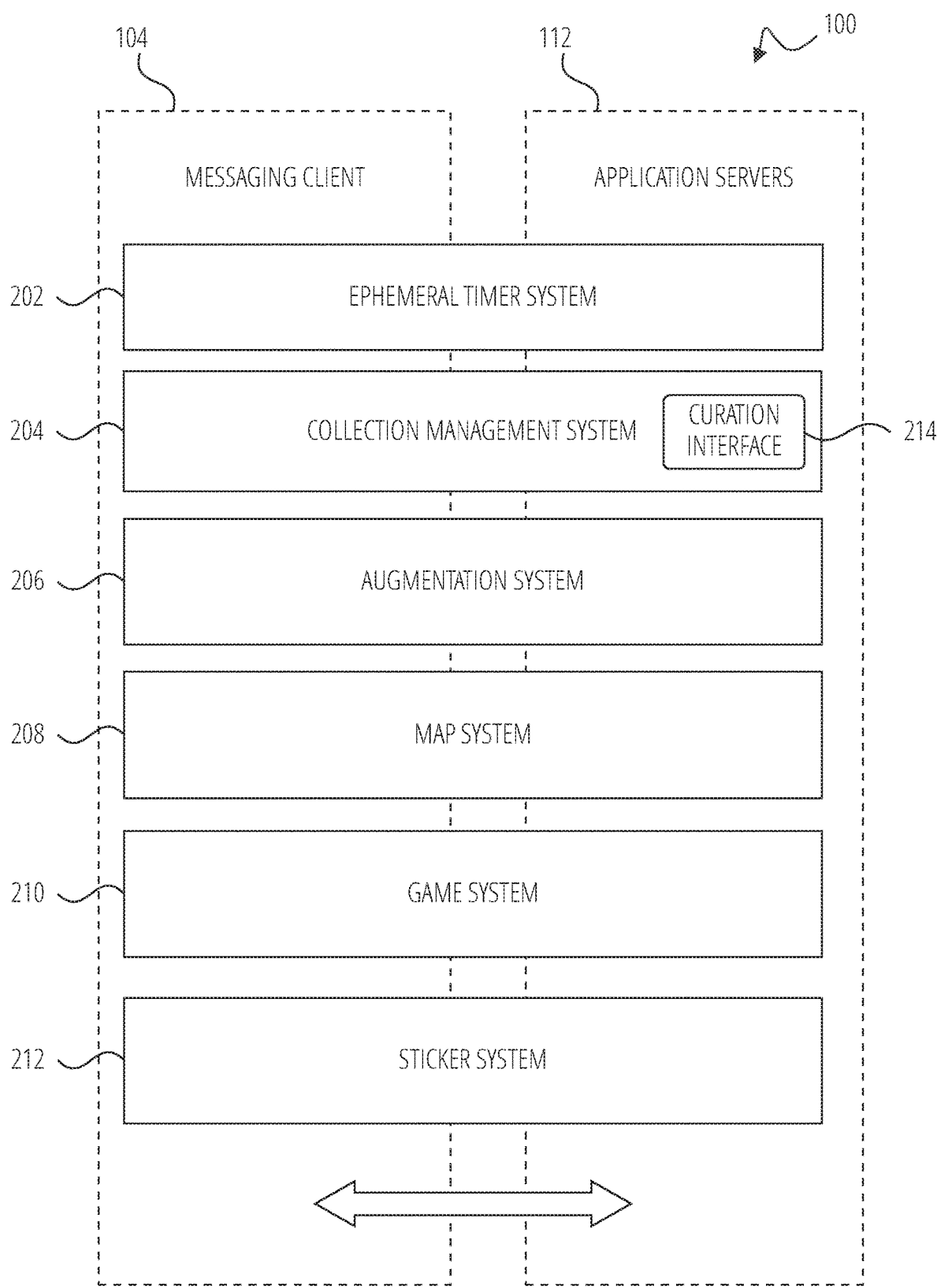
FIG. 2 is a diagrammatic representation of a messaging system that has both client-side and server-side functionality, in accordance with some example embodiments.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the server-side by the application servers 112. These subsystems include, for example, an ephemeral timer system 202, a collection management system 204, an augmentation system 206, a map system 208, a game system 210 and/or a sticker system 212.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a Story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event Story." Such a collection may be made available for a specified time period, such as the duration of an event to which the content relates. For example, content relating to a music concert may be made available as a "Story" for the duration of that music concert. The collection management system 204 may also be responsible for publishing an icon that provides notification of the existence of a particular collection to the user interface of the messaging client 104.

The collection management system 204 furthermore includes a curation interface 214 that allows a collection manager to manage and curate a particular collection of content. For example, the curation interface 214 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The sticker system 212 provides various sticker functions within the context of the messaging system 100. As described herein, a sticker is a digital image or icon used in messaging. A sticker may be placed or added (e.g., at a user-defined position) within a message. A sticker may accompany other content (e.g., text and/or images) within a message. Alternatively, a sticker may itself correspond to the entirety of a message. In one or more embodiments, the sticker system 212 is configured to maintain a collection of stickers that are available for messaging with respect to the messaging client 104. Moreover, the sticker system 212 may implement a recommendation system configured to select, from among the collection of available stickers, a recommended set of stickers for use in messaging. For example, when viewing a particular media content item (e.g., a message with media content, a Story, etc.) provided by another user, the messaging client 104 may present the selected set of stickers within a reply interface. A user may select a sticker, from among the selected set of stickers, for including in a reply message to the media content item provided by the other user.

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations), if any. A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on the client device 102 and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client application 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a Story or a gallery). The creation of a particular collection may be initiated by a particular user (e.g., each user for which a record is maintained in the entity table 304). A user may create a "personal Story" in the form of a collection of content that has been created and sent/broadcast by that user. To this end, the user interface of the messaging client 104 may include an icon that is user-selectable to enable a sending user to add specific content to his or her personal Story.

A collection may also constitute a "live Story," which is a collection of content from multiple users that is created manually, automatically, or using a combination of manual and automatic techniques. For example, a "live Story" may constitute a curated stream of user-submitted content from varies locations and events. Users whose client devices have location services enabled and are at a common location event at a particular time may, for example, be presented with an option, via a user interface of the messaging client 104, to contribute content to a particular live Story. The live Story may be identified to the user by the messaging client 104, based on his or her location. The end result is a "live Story" told from a community perspective.

A further type of content collection is known as a "location Story," which enables a user whose client device 102 is located within a specific geographic location (e.g., on a college or university campus) to contribute to a particular collection. In some examples, a contribution to a location Story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

In one or more embodiments, the database 120 also stores a sticker table 318 for storing a collection of stickers. For example, the sticker table 318 stores an indication (e.g., a list) of stickers available for selection by a user of the messaging client 104. As discussed above, the collection of stickers is maintained by the sticker system 212, with each sticker corresponding to a digital image or icon. For example, the stickers stored within the sticker table 318 may include one or more of emojis, graphics-based symbols, graphics with words incorporated therein, pictures, animated images, or other types of digital images/icons.

In one or more embodiments, one or more stickers in the sticker table 318 are associated with different attributes (e.g., different moods/expressions). For example, a particular sticker may be associated with one or more predefined words using metadata labels, designations, and the like that associate with a respective mood/expression. As discussed below, the messaging client 104 may search the predefined words stored in the sticker table 318 to identify one or more stickers associated with a particular term (e.g., a text-based term).

Figure 4:
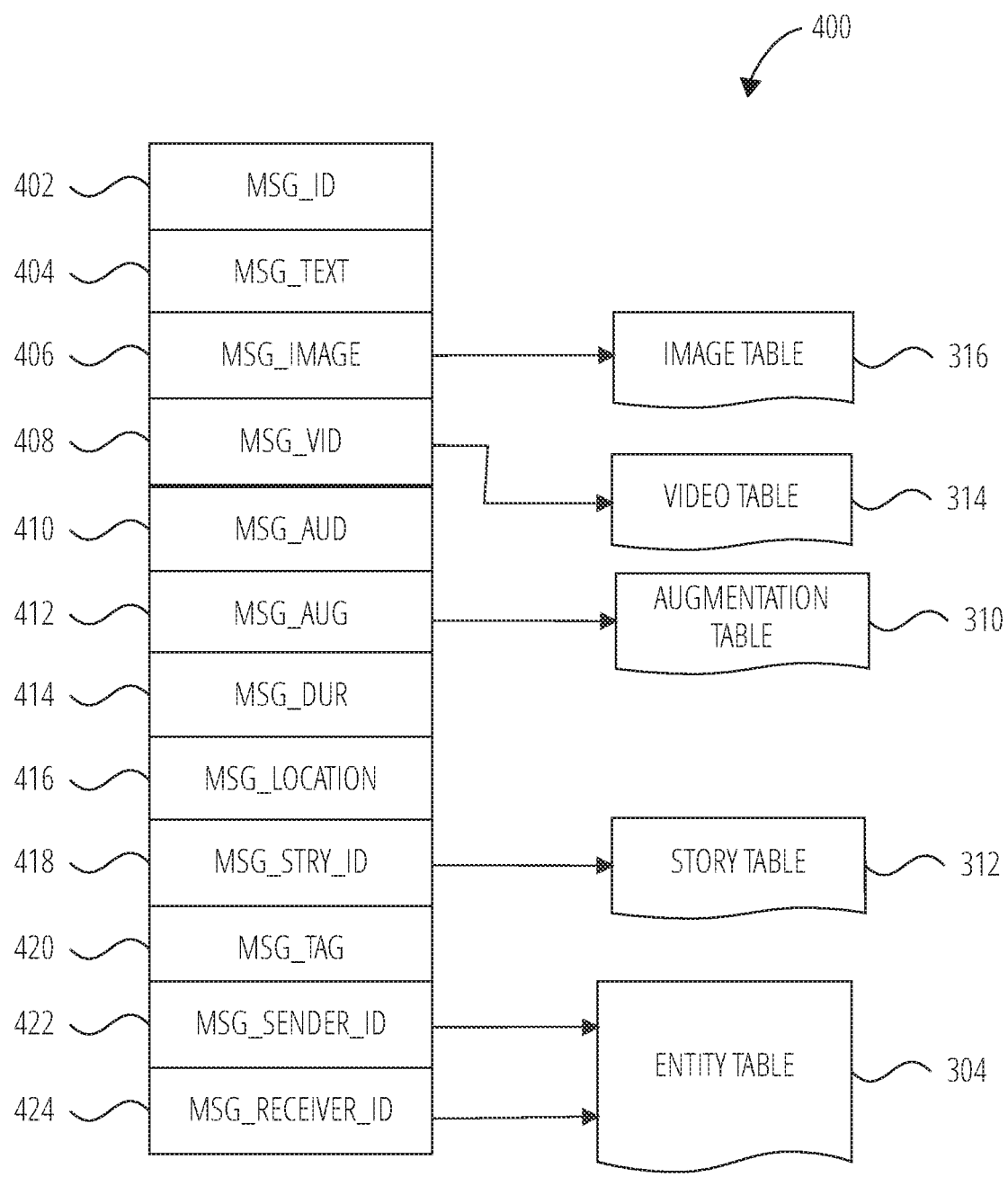
FIG. 4 is a diagrammatic representation of a message, in accordance with some example embodiments.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 316.
- message video payload 408: video data, captured by a camera component or retrieved from a memory component of the client device 102, and that is included in the message 400. Video data for a sent or received message 400 may be stored in the video table 314.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "Stories" identified in the story table 312) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Figure 5:
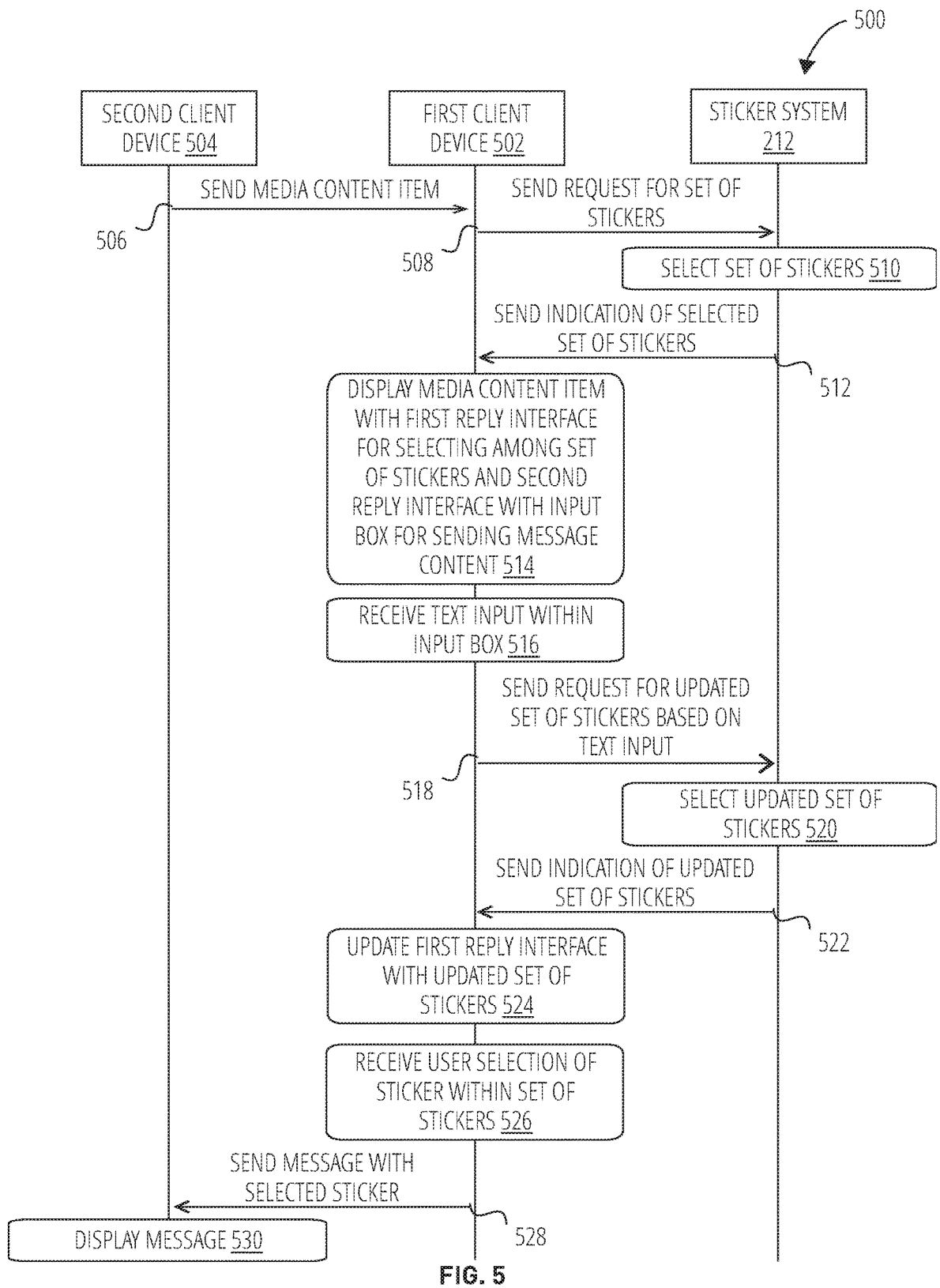
FIG. 5 is an interaction diagram illustrating a process for providing a reply interface with selectable stickers for sending in a message, in accordance with some example embodiments.

FIG. 5 is an interaction diagram illustrating a process 500 for providing a reply interface with selectable stickers for sending in a message, in accordance with some example embodiments. For explanatory purposes, the process 500 is primarily described herein with reference to a first client device 502 and a second client device 504 (e.g., each of which may correspond to a respective client device 102), and with reference to the sticker system 212. However, one or more blocks (or operations) of the process 500 may be performed by one or more other components, and/or by other suitable devices. Further for explanatory purposes, the blocks (or operations) of the process 500 are described herein as occurring in serial, or linearly. However, multiple blocks (or operations) of the process 500 may occur in parallel or concurrently. In addition, the blocks (or operations) of the process 500 need not be performed in the order shown and/or one or more blocks (or operations) of the process 500 need not be performed and/or can be replaced by other operations. The process 500 may be terminated when its operations are completed. In addition, the process 500 may correspond to a method, a procedure, an algorithm, etc.

Each of the first client device 502 and the second client device 504 may have instances of the messaging client 104 installed thereon. The first client device 502 and the second client device 504 may be associated with a respective first user and second user of the messaging server system 108. For example, the first user may be associated with a first user account of the messaging server system 108, and the second user may be associated with a second user account of the messaging server system 108. As noted above, the first and second users may be identified by the messaging server system 108 based on unique identifiers (e.g., a messaging system identifier, email address and/or a device identifier) associated with respective user accounts for the first and second users. In addition, the messaging server system 108 may implement and/or work in conjunction with the social network server 122 which is configured to identify other users (e.g., friends) with which a particular user has relationships.

As described herein, the messaging client 104 running on the first client device 502 is configured to display first and second reply interfaces in conjunction with displaying a media content item (e.g., a message with media content, or a collection of media content) provided by the second user. The first reply interface includes a set of a predefined number of stickers (e.g., a set of 9 stickers), each of which is user-selectable for sending as a reply message to the media content item provided by the second user. On the other hand, the second reply interface includes an input box (e.g., configured to receive text input) for sending message content as a reply message to the second user. By virtue of including both of the first and second reply interfaces, the first user may be more encouraged to reply to media content items provided another user (e.g., the second user).

At operation 506, the second client device 504 of the second user sends a media content item to the first client device 502. For example, the media content item may correspond to a message (e.g., with media content) or a Story (e.g., a collection of media content) that was directly sent by the second user to the first user via the messaging server system 108. In another example, the media content item corresponds to a Story broadcast by the second user, and selected for viewing by the first user via the messaging server system 108.

At operation 508, the first client device 502 sends a request for a set of stickers to the sticker system 212. As noted above, the sticker system 212 is configured to maintain a collection of stickers (e.g., stored in the sticker table 318) that are available for messaging, and/or to implement a recommendation system for selecting set(s) of stickers for replying to received media content items.

As also noted above, the sticker system 212 may correspond to a subsystem of the messaging system 100, and may be supported on the client side by the messaging client 104 (e.g., of the first client device 502) and/or on the server side by the application servers 112. Thus, in one or more embodiments, the above-mentioned maintaining of the collection of stickers and/or the recommendation system for selecting set(s) of stickers may be implemented client side, server side and/or a combination of client side and server side.

At block 510, the sticker system 212 selects the set of stickers. In one or more embodiments, the sticker system 212 is configured to select the stickers based on a determination (e.g., by the messaging system 100) that the first user account does not have an avatar associated therewith. For example, the first user may not have opted in or otherwise selected an avatar representation for use within the messaging system 100. The messaging system 100 as described herein provides the first user, who has not avatar, with user interface elements (e.g., a reply interface with a set of stickers) to encourage increased engagement with respect to messaging.

In one or more embodiments, the sticker system 212 is configured to select a preset number of stickers from among the collection of available stickers stored by the sticker table 318. For example, while the collection of available stickers may include hundreds of stickers, the sticker system 212 may set the preset number of stickers to 9.

In one or more embodiments, the selected set of stickers represents a variety of different moods/expressions. As noted above, the sticker table 318 may store attributes (e.g., predefined words), corresponding to respective moods/expressions, in association with stickers. In one or more embodiments, the selected set of stickers may include respective stickers associated with one or more of the following moods/expressions: love (e.g., where the sticker is a heart image and/or depicts words such as "love"); laughing (e.g., a laughing face icon and/or words such as "haha!"); an expression that the media content item is exciting (e.g., a fire icon and/or words such as "on fire" or "lit"); approval/applause (e.g., a thumbs up icon, clapping icon and/or words such as "yay!"); shock/awe (e.g., a surprised face icon and/or words such as "wow"); sadness (e.g., a crying/frowning face icon); anger (e.g., an angry face icon). As such, each sticker in the set of stickers may be user-selectable for conveying a respective mood/expression for sending in a message to the second client device 504 (e.g., as a response to the media content item provided by the second user).

The set of stickers selected by the sticker system 212 may correspond to a predefined set of stickers, for example, that represent the above-mentioned variety of moods/expressions. Thus, in a case where the preset number of stickers within the set is 9, the sticker system 212 may preselect a set of 9 stickers from among the collection of available stickers stored in the sticker table 318.

Alternatively, the set of stickers selected by the sticker system 212 may correspond to a predefined number of stickers (e.g., 9 stickers) that are randomly selected set from among the collection of available stickers (e.g., stored in the sticker table 318). Thus, in response to the request at operation 508, the sticker system 212 may use a random number generator to select 9 stickers from among the collection of available stickers. In one or more embodiments, the sticker system 212 may randomly select an individual sticker from each mood/expression category. For example, for each of 9 mood/expression categories, the sticker system 212 may randomly select a corresponding sticker for that mood/expression (e.g., based on the predefined words stored in the sticker table 318).

At operation 512, the sticker system 212 sends an indication of the selected set of stickers to the first client device 502. For example, the sticker system 212 provides the set of selected images to the first client device 502 as image data.

Alternatively, the sticker system 212 provides a reference (e.g., a pointer) to the image data for the set of stickers.

At block 514, the first client device 502 displays the media content item, together with first and second reply interfaces, for generating a reply message to the media content item. In one or more embodiments, display of the first and second reply interfaces is in response to a predefined user gesture (e.g., a swipe up gesture) on an initial screen which shows the media content item without the first and second reply interfaces.

As discussed further below with respect to FIG. 8, the first reply interface depicts the set of stickers (e.g., 9 stickers) as user-selectable icons for responding to the media content item. Moreover, the second reply interface includes an input box (e.g., configured to receive text input), together with additional interface elements for generating message content (e.g., a keyboard interface, a photo selection interface, and/or an expanded sticker selection interface). By virtue of presenting the first reply interface as a separate interface from the second reply interface, it is possible to encourage increased messaging by the first user.

In one or more embodiments, the first user at the first client device 502 may provide user input (e.g., text input) via the input box of the second reply interface (block 516). In such a case, at operation 518, the first client device 502 sends a request for an updated set of stickers to the sticker system 212, where the request includes the text input provided by the first user. The first client device 502 queries the sticker system 212 with the text input corresponding to a term (e.g., or partial term). The first client device 502 sends the term (or partial term) to the sticker system 212, for selecting a preset number of stickers (e.g., 9 stickers) based on the term (block 520).

The sticker system 212 selects an updated set of stickers from the sticker table 318, for example, based on the associated attributes (e.g., predefined words) stored in the sticker table 318 that match (in whole or in part) with the term (or partial term). For instance, the first user may have provided text input of the term "Yes!!" via the input box of the second replay interface. The sticker system 212 may determine which stickers in the sticker table 318 match (or most closely match) the term, based on the predefined words (e.g., corresponding to moods/expressions) stored in the sticker table 318 in association with the stickers.

In selecting the set of stickers, the sticker system 212 may calculate respective relevancy scores for stickers, for example, based on a number or frequency of confirmed matches between the input term and sticker attributes (e.g., predefined words). The relevancy scores may be used to limit the number of stickers that are selected (e.g., the 9 stickers with the highest relevancy scores) and/or for displaying the selected stickers in ranked order.

At operation 522, the sticker system 212 sends an indication of the updated set of stickers to the first client device 502. The sticker system 212 may also send an indication of the ranking of the stickers (e.g., based on the relevancy scores), for display of the stickers in ranked order. Alternatively, in a case where the calculated relevancy scores are below a predefined value (e.g., suggesting that the input term does not appear to match a mood/expression within the collection of stickers stored in the sticker table 318), the sticker system 212 may instead send an indication that the set of stickers is not to be updated.

At block 524, the first client device 502 updates the first reply interface, by replacing the original set of stickers with the updated set of stickers. In one or more embodiments, the first client device 502 displays the set of stickers in ranked order based on the rankings provided by the sticker system 212. In this manner, it is possible for the set of stickers presented within the first reply interface to be updated (e.g., in real time) based on text-based terms entered within the input box.

In one or more embodiments, the first user at the first client device 502 may select a sticker for sending to the second user at the second client device 504. In such a case, at block 526, the first client device 502 receives user selection of a sticker within the set of stickers (e.g., the updated set of stickers, or the original set of stickers in a case when the stickers were not updated). The user selection may correspond to a predefined gesture (e.g., a tap gesture) for selecting the sticker.

In one or more embodiments, the set of stickers within the second reply interface is initially presented in an inactive state at a first opacity level. In response to a predefined user gesture (e.g., a tap or swipe gesture) within a predesignated region of the first reply interface, the messaging client 104 may cause the set of stickers to become activated for user selection. The activated set of stickers may be displayed at a second opacity level which is higher than the first opacity level. Thus, activation of the set of stickers may cause the set of stickers to be displayed with increased opacity, to indicate that the set of stickers is available for selection by the first user.

At operation 528, in response to user selection of a sticker, the first client device 502 sends a message with the selected sticker to the second client device 504. Moreover, in response to user selection of the sticker, the first client device 502 may update the second reply interface, for example, by removing the keyboard interface therefrom.

At block 530, the second client device 504 displays a message including the selected sticker to the second user. In one or more embodiments, the second client device 504 displays the received sticker within a chat interface of the messaging client 104, for example, as part of a message thread between the first client device 502 and the second client device 504.

Figure 6:
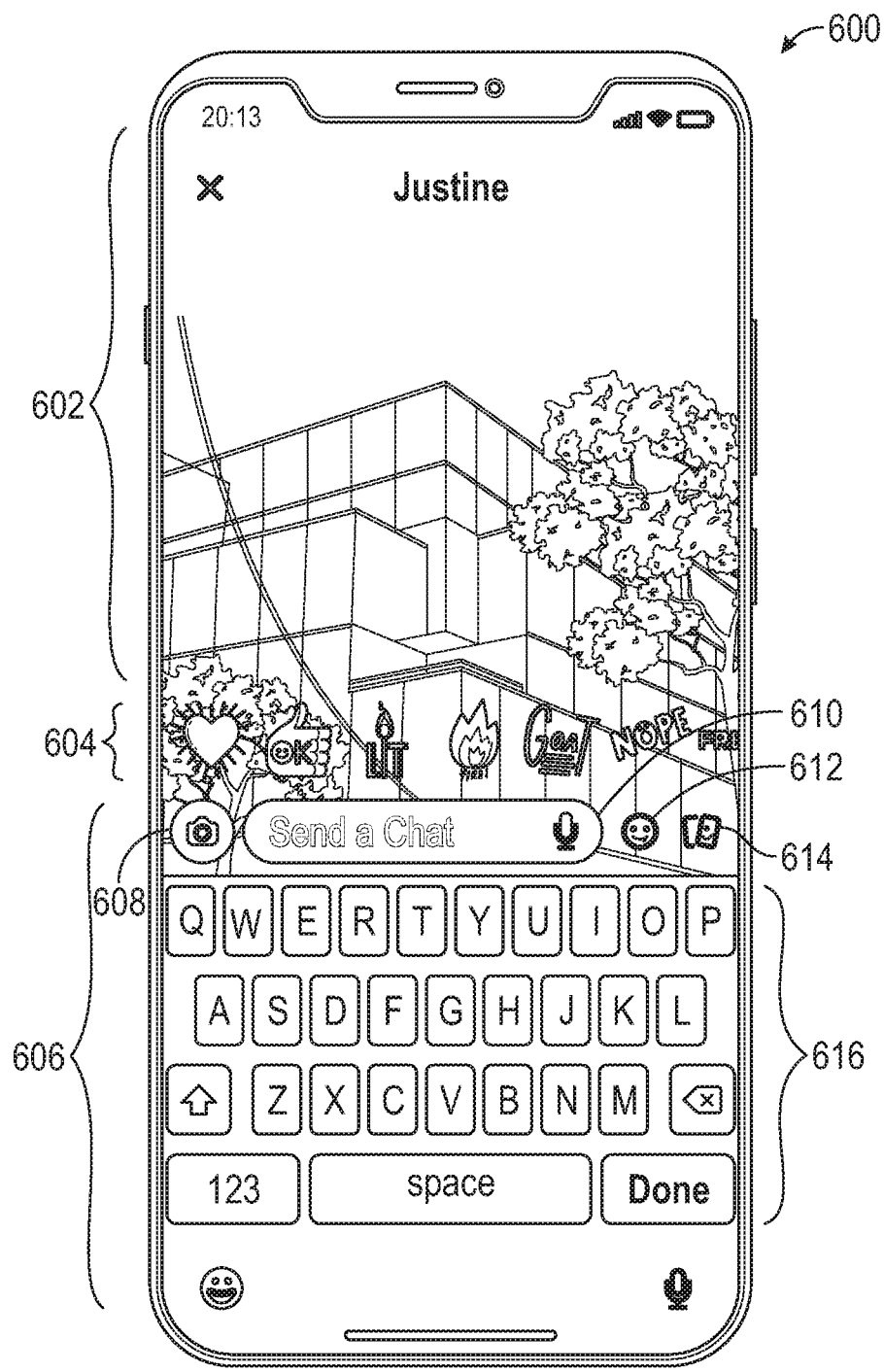
FIG. 6 illustrates an example user interface for displaying a media content item together with a reply interface for selecting a sticker to send in a message, in accordance with some example embodiments.

FIG. 6 illustrates an example user interface 600 for displaying a media content item together with a reply interface for selecting a sticker to send in a message, in accordance with some example embodiments. In the example of FIG. 6, the user interface 600 includes display of a media content item 602, a first reply interface 604, and a second reply interface 606 which includes interface elements 608-616.

The media content item 602 is displayed by the messaging client 104. The media content item 602 corresponds to a message (e.g., with media content) or a Story (e.g., a collection of media content). As noted above, in one or more embodiments, the first reply interface 604 and the second reply interface 606 are provided for display with the media content item 602, for example, in response to a predefined gesture (e.g., a swipe up gesture) performed on the displayed media content item 602.

As described herein, the first reply interface 604 presents a set of stickers, as selected by the sticker system 212. Each sticker in the set of stickers is user-selectable for generating/sending a reply message which includes the selected sticker. The set of stickers may correspond to a variety of different moods/expressions, and include a predefined number of stickers (e.g., 9 stickers). The set of stickers may be displayed as a carousel interface. For example, while the example of FIG. 6 may initially depict 6 stickers within the set of 9 stickers, the remaining 3 stickers may be accessed by performing a predefined gesture (e.g., a left or right swipe gesture) on the carousel interface, such that the first user can cycle through the 9 stickers.

As noted above, the set of stickers within the first reply interface 604 may initially be displayed at a reduced opacity, indicating that the set of stickers has not yet been activated. In response to a predefined gesture (e.g., a tap or swipe within the first reply interface 604), the messaging client 104 may activate the set of stickers for user selection and display the set of stickers with an increased opacity. User selection of a sticker may cause the messaging client 104 to send a sticker-based reply message to the user who provided the media content item 602 (e.g., the second user).

Moreover, the second reply interface 606 includes an input box 610 configured for user input. For example, user input may be provided by one or more of: an image capture icon 608 for capturing an image/video via a device camera for including in a reply message; a sticker selection icon 612 for showing an expanded set of stickers (e.g., all available stickers stored in the sticker table 318, as opposed to the set of 9 stickers in the first reply interface 604); a photo library icon 614 for selecting an image/video selected from a photo library (e.g., of the client device 102); and a keyboard interface 616 for user input of text within the input box 610.

As noted above, the messaging client 104 is configured to update the set of stickers included within the first reply interface 604 in response to text-based terms entered within the input box 610. In one or more embodiments, the sticker selection icon 612 may update to depict a highest-ranked sticker (e.g., a sticker with a highest relevancy score, as described above). However, in an alternative implementation to reduce redundancy, the sticker selection icon 612 may not be updated with the highest-ranked sticker, since the updated set of stickers within the first reply interface 604 would already include the highest-ranked sticker.

Figure 7:
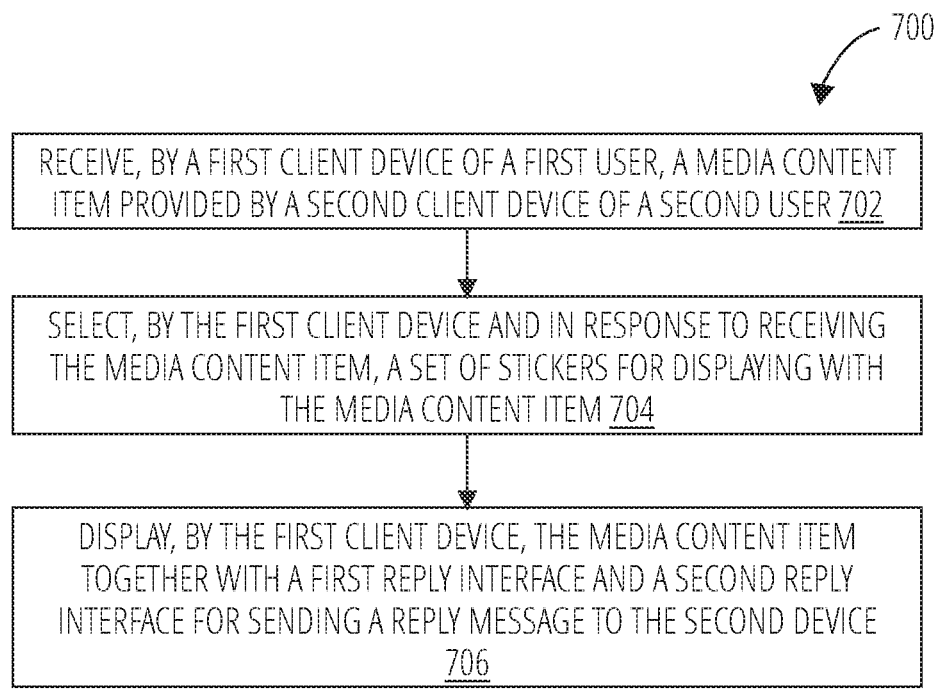
FIG. 7 is a flowchart illustrating a process for providing a reply interface with selectable stickers for sending in a message, in accordance with some example embodiments.

FIG. 7 is a flowchart illustrating a process 700 for providing a reply interface with selectable stickers for sending in a message, in accordance with some example embodiments. For explanatory purposes, the process 700 is primarily described herein with reference to the first client device 502 and the second client device 504 (e.g., each of which may correspond to a respective client device 102) of FIG. 5. However, one or more blocks (or operations) of the process 700 may be performed by one or more other components, and/or by other suitable devices. Further for explanatory purposes, the blocks (or operations) of the process 700 are described herein as occurring in serial, or linearly. However, multiple blocks (or operations) of the process 700 may occur in parallel or concurrently. In addition, the blocks (or operations) of the process 700 need not be performed in the order shown and/or one or more blocks (or operations) of the process 700 need not be performed and/or can be replaced by other operations. The process 700 may be terminated when its operations are completed. In addition, the process 700 may correspond to a method, a procedure, an algorithm, etc.

The first client device 502 of a first user receives a media content item provided by the second client device 504 of a second user (block 702). The first user and the second user may correspond to contacts within a messaging client 104 running on each of the first client device 502 and the second client device 504. The media content item may correspond to a collection of media content items (e.g., a Story).

The first client device 502 determines, in response to receiving the media content item, a set of stickers for displaying with the media content item (block 704). Determining the set of stickers may be further in response to determining that the first user does not have an avatar associated therewith.

The set of stickers may correspond to a predefined set of stickers for displaying in a predefined order. Alternatively, the set of stickers may correspond to a subset of stickers randomly selected from among a set of available stickers.

The first client device 502 displays the media content item together with a first reply interface and a second reply interface for sending a reply message to the second device (block 706). The first reply interface includes the set of stickers, each of which is selectable by the first user for sending to the second device. The second reply interface includes an input box for sending message content to the second device.

The first client device 502 may receive user selection of a predefined portion of the first reply interface. In response to receiving the user selection, the first client device 502 may activate the set of stickers for selection by the first user, and may display the set of stickers with an increased opacity.

The first client device 502 may receive, via the input box of the second reply interface, text input provided by the first user, determine, based on the text input, a second set of stickers for displaying with the media content item, and update the first reply interface by replacing the set of stickers with the second set of stickers. The first client device 502 may determine a relevancy score for each sticker within the second set of stickers, and order the second set of stickers within the first reply interface based on the determined relevancy scores.

The first client device 502 may receive, via the first reply interface, user selection of a sticker within the set of stickers, and provide for transmission of the selected sticker to the second client device 504.

Figure 8:
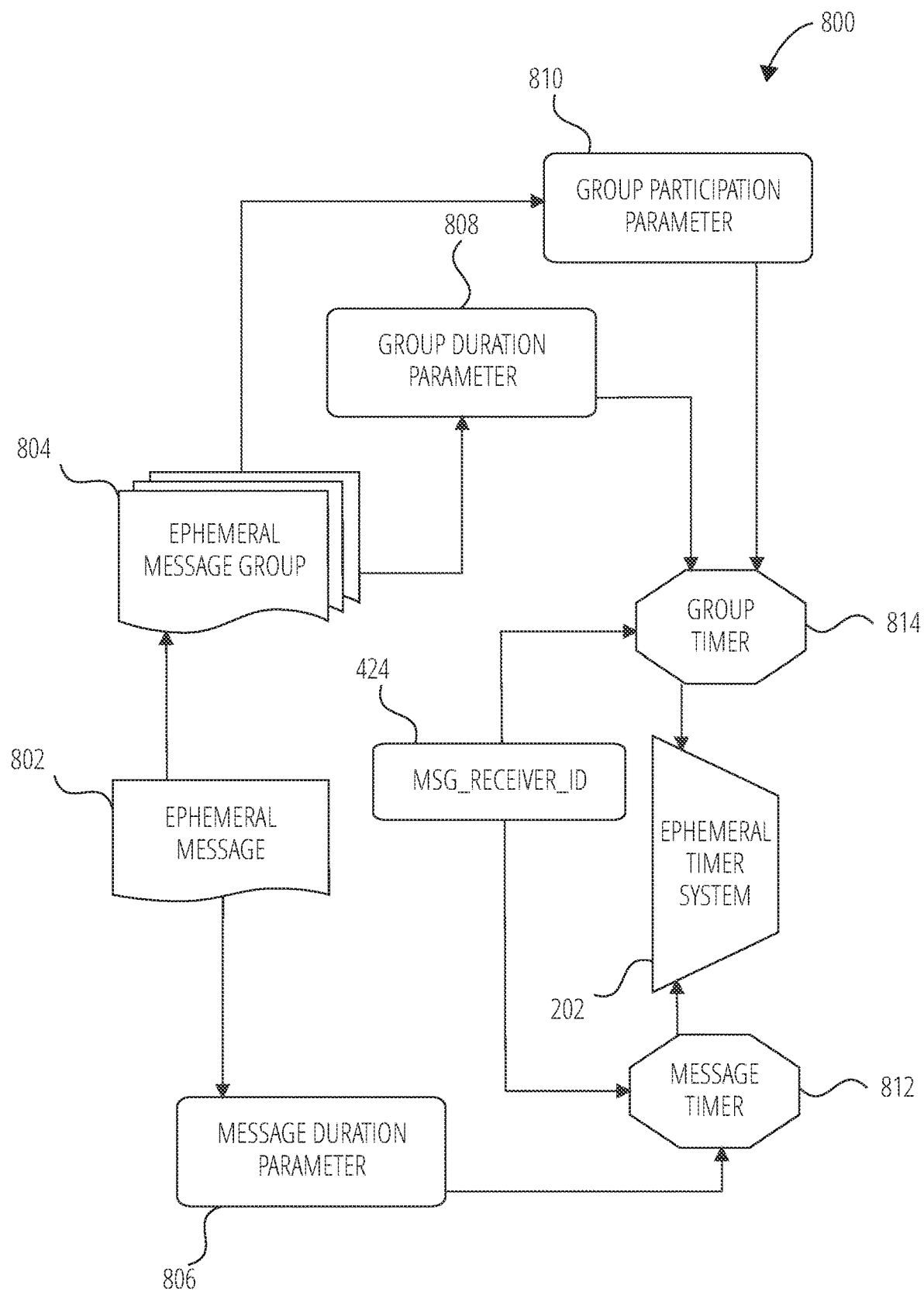
FIG. 8 is a flowchart for an access-limiting process, in accordance with some example embodiments.

FIG. 8 is a schematic diagram illustrating an access-limiting process 800, in terms of which access to content (e.g., an ephemeral message 802, and associated multimedia payload of data) or a content collection (e.g., an ephemeral message group 804) may be time-limited (e.g., made ephemeral).

An ephemeral message 802 is shown to be associated with a message duration parameter 806, the value of which determines an amount of time that the ephemeral message 802 will be displayed to a receiving user of the ephemeral message 802 by the messaging client 104. In one example, an ephemeral message 802 is viewable by a receiving user for up to a maximum of 10 seconds, depending on the amount of time that the sending user specifies using the message duration parameter 806.

The message duration parameter 806 and the message receiver identifier 424 are shown to be inputs to a message timer 812, which is responsible for determining the amount of time that the ephemeral message 802 is shown to a particular receiving user identified by the message receiver identifier 424. In particular, the ephemeral message 802 will only be shown to the relevant receiving user for a time period determined by the value of the message duration parameter 806. The message timer 812 is shown to provide output to a more generalized ephemeral timer system 202, which is responsible for the overall timing of display of content (e.g., an ephemeral message 802) to a receiving user.

The ephemeral message 802 is shown in FIG. 8 to be included within an ephemeral message group 804 (e.g., a collection of messages in a personal Story, or an event Story). The ephemeral message group 804 has an associated group duration parameter 808, a value of which determines a time duration for which the ephemeral message group 804 is presented and accessible to users of the messaging system 100. The group duration parameter 808, for example, may be the duration of a music concert, where the ephemeral message group 804 is a collection of content pertaining to that concert. Alternatively, a user (either the owning user or a curator user) may specify the value for the group duration parameter 808 when performing the setup and creation of the ephemeral message group 804.

Additionally, each ephemeral message 802 within the ephemeral message group 804 has an associated group participation parameter 810, a value of which determines the duration of time for which the ephemeral message 802 will be accessible within the context of the ephemeral message group 804. Accordingly, a particular ephemeral message group 804 may "expire" and become inaccessible within the context of the ephemeral message group 804, prior to the ephemeral message group 804 itself expiring in terms of the group duration parameter 808. The group duration parameter 808, group participation parameter 810, and message receiver identifier 424 each provide input to a group timer 814, which operationally determines, firstly, whether a particular ephemeral message 802 of the ephemeral message group 804 will be displayed to a particular receiving user and, if so, for how long. Note that the ephemeral message group 804 is also aware of the identity of the particular receiving user as a result of the message receiver identifier 424.

Accordingly, the group timer 814 operationally controls the overall lifespan of an associated ephemeral message group 804, as well as an individual ephemeral message 802 included in the ephemeral message group 804. In one example, each and every ephemeral message 802 within the ephemeral message group 804 remains viewable and accessible for a time period specified by the group duration parameter 808. In a further example, a certain ephemeral message 802 may expire, within the context of ephemeral message group 804, based on a group participation parameter 810. Note that a message duration parameter 806 may still determine the duration of time for which a particular ephemeral message 802 is displayed to a receiving user, even within the context of the ephemeral message group 804. Accordingly, the message duration parameter 806 determines the duration of time that a particular ephemeral message 802 is displayed to a receiving user, regardless of whether the receiving user is viewing that ephemeral message 802 inside or outside the context of an ephemeral message group 804.

The ephemeral timer system 202 may furthermore operationally remove a particular ephemeral message 802 from the ephemeral message group 804 based on a determination that it has exceeded an associated group participation parameter 810. For example, when a sending user has established a group participation parameter 810 of 24 hours from posting, the ephemeral timer system 202 will remove the relevant ephemeral message 802 from the ephemeral message group 804 after the specified 24 hours. The ephemeral timer system 202 also operates to remove an ephemeral message group 804 when either the group participation parameter 810 for each and every ephemeral message 802 within the ephemeral message group 804 has expired, or when the ephemeral message group 804 itself has expired in terms of the group duration parameter 808.

In certain use cases, a creator of a particular ephemeral message group 804 may specify an indefinite group duration parameter 808. In this case, the expiration of the group participation parameter 810 for the last remaining ephemeral message 802 within the ephemeral message group 804 will determine when the ephemeral message group 804 itself expires. In this case, a new ephemeral message 802, added to the ephemeral message group 804, with a new group participation parameter 810, effectively extends the life of an ephemeral message group 804 to equal the value of the group participation parameter 810.

Responsive to the ephemeral timer system 202 determining that an ephemeral message group 804 has expired (e.g., is no longer accessible), the ephemeral timer system 202 communicates with the messaging system 100 (and, for example, specifically the messaging client 104) to cause an indicium (e.g., an icon) associated with the relevant ephemeral message group 804 to no longer be displayed within a user interface of the messaging client 104. Similarly, when the ephemeral timer system 202 determines that the message duration parameter 806 for a particular ephemeral message 802 has expired, the ephemeral timer system 202 causes the messaging client 104 to no longer display an indicium (e.g., an icon or textual identification) associated with the ephemeral message 802.

Figure 9:
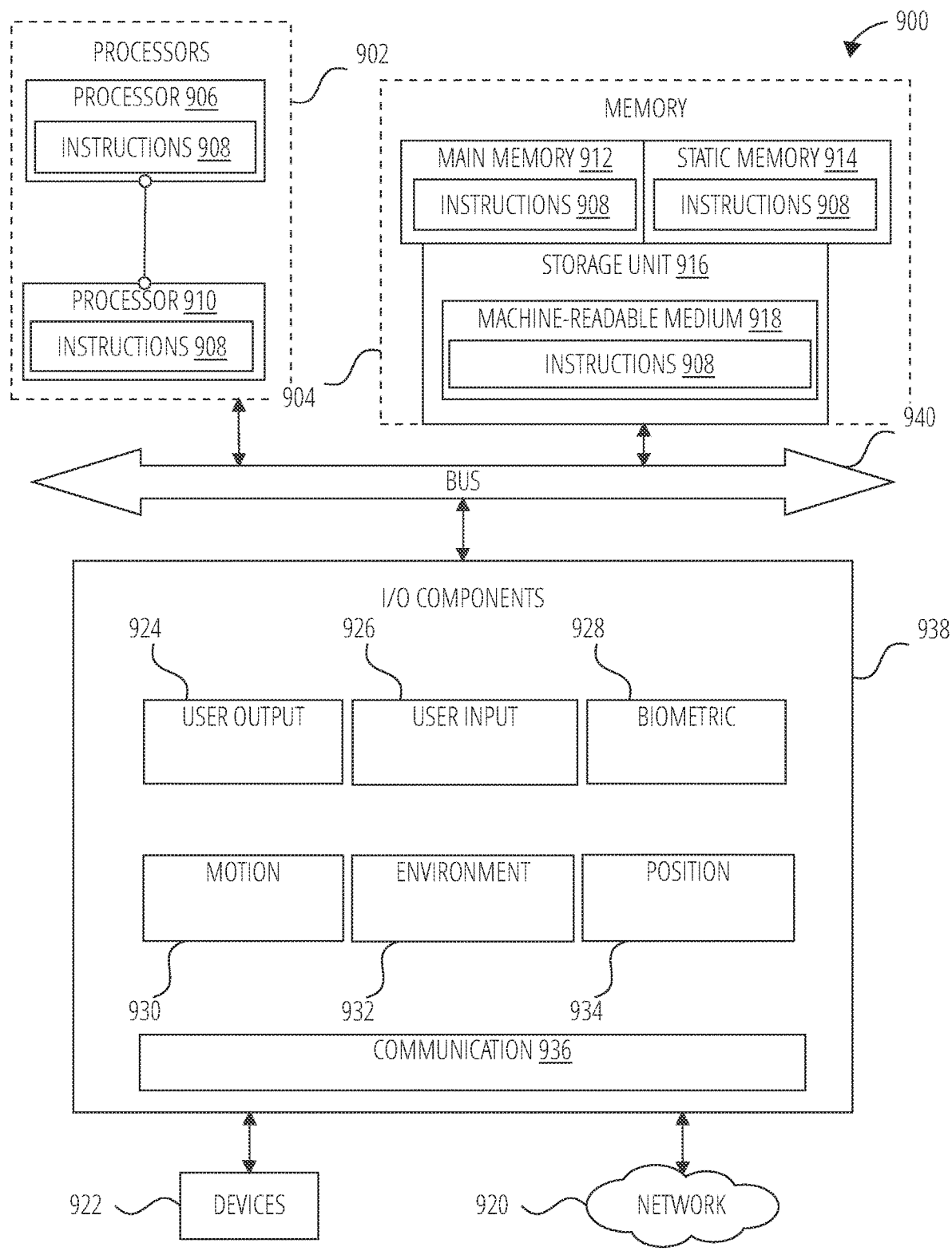
FIG. 9 is a diagrammatic representation of a machine in the form of a computer system within which a set of instructions may be executed for causing the machine to perform any one or more of the methodologies discussed herein, in accordance with some example embodiments.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include processors 902, memory 904, and input/output I/O components 938, which may be configured to communicate with each other via a bus 940. In an example, the processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single-core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 940. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 within the storage unit 916, within at least one of the processors 902 (e.g., within the Processor's cache memory), or any suitable combination thereof, during execution thereof by the machine 900.

The I/O components 938 may include a wide variety of components to receive input, provide output, produce output, transmit information, exchange information, capture measurements, and so on. The specific I/O components 938 that are included in a particular machine will depend on the type of machine. For example, portable machines such as mobile phones may include a touch input device or other such input mechanisms, while a headless server machine will likely not include such a touch input device. It will be appreciated that the I/O components 938 may include many other components that are not shown in FIG. 9. In various examples, the I/O components 938 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 938 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 3600 photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 938 further include communication components 936 operable to couple the machine 900 to a network 920 or devices 922 via respective coupling or connections. For example, the communication components 936 may include a network interface Component or another suitable device to interface with the network 920. In further examples, the communication components 936 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 912, static memory 914, and memory of the processors 902) and storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 936) and using any one of several well-known transfer protocols (e.g., hypertext transfer protocol (HTTP)). Similarly, the instructions 908 may be transmitted or received using a transmission medium via a coupling (e.g., a peer-to-peer coupling) to the devices 922.

Figure 10:
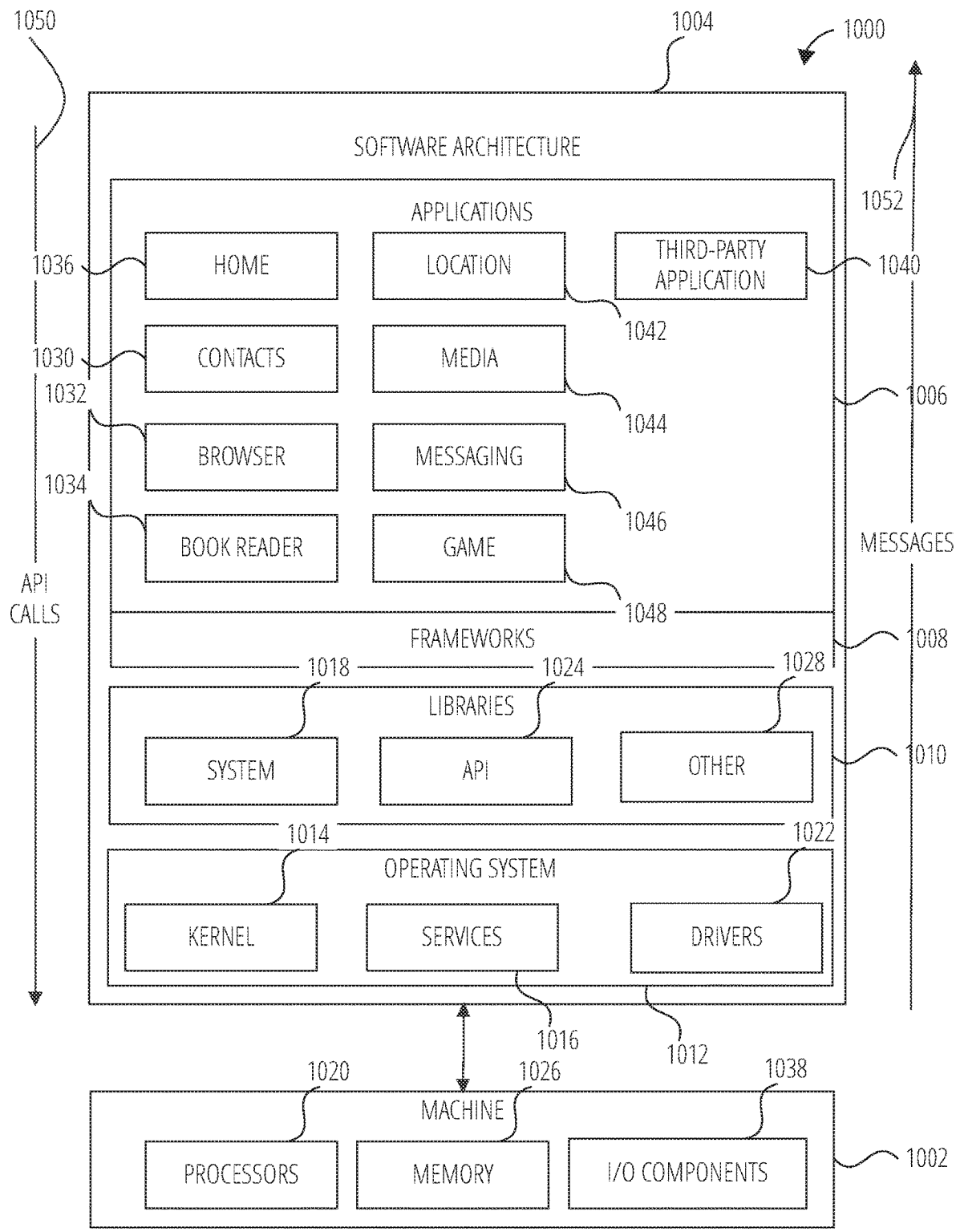
FIG. 10 is a block diagram showing a software architecture within which examples may be implemented, in accordance with some example embodiments.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
   receiving, for display on a first device of a first user, a media content item from a second device of a second user, the first and second users being contacts within a messaging system;
   determining, in response to receiving the media content item, that the first user has not opted in or otherwise selected an avatar for use within the messaging system;
   selecting, in response to the determining, a first set of stickers for displaying with the media content item, the first set of stickers corresponding to non-avatar based stickers;
   causing display of the media content item together with a first reply interface and a second reply interface on the first device, the second reply interface for sending a reply message to the second device,
   wherein the first reply interface includes the first set of stickers, each of which is selectable by the first user for sending to the second device, and
   wherein the second reply interface includes an input box for sending message content to the second device;
   receiving an indication of text input provided by the first user via the input box of the second reply interface;
   determining, based on the text input, a second set of stickers for displaying with the media content item, the second set of stickers being different than the first set of stickers and corresponding to non-avatar based stickers; and
   causing updated display of the first reply interface by replacing the first set of stickers with the second set of stickers.

2. The method of claim 1, wherein the first set of stickers corresponds to a predefined set of stickers for displaying in a predefined order.

3. The method of claim 1, wherein the first set of stickers corresponds to a subset of stickers randomly selected from among a set of available stickers.

4. The method of claim 1, further comprising:
   determining a relevancy score for each sticker within the second set of stickers; and
   ordering the second set of stickers within the first reply interface based on the determined relevancy scores.

5. The method of claim 1, further comprising:
   receiving user selection of a predefined portion of the first reply interface; and
   in response to receiving the user selection,
   activating the first set of stickers for selection by the first user, and
   displaying the first set of stickers with an increased opacity.

6. The method of claim 1, further comprising:
   receiving, via the first reply interface, user selection of a sticker within the second set of stickers; and
   providing, by the first device, for transmission of the selected sticker to the second device.

7. The method of claim 1, wherein the media content item corresponds to a collection of media content items.

8. The method of claim 1, wherein the first user and the second user correspond to contacts within a messaging application running on each of the first device and the second device.

9. A system, comprising:
   a processor; and
   a memory storing instructions that, when executed by the processor, configure the system to:
   receive, for display on a first device associated with a first user, a media content item from a second device of a second user, the first and second users being contacts within a messaging system;
   determine, in response to receiving the media content item, that the first user has not opted in or otherwise selected an avatar for use within the messaging system;
   select, in response to the determining, a first set of stickers for displaying with the media content item, the first set of stickers corresponding to non-avatar based stickers;
   cause display of the media content item together with a first reply interface and a second reply interface on the first device, the second reply interface for sending a reply message to the second device, wherein the first reply interface includes the first set of stickers, each of which is selectable by the first user for sending to the second device, and wherein the second reply interface includes an input box for sending message content to the second device;

receive an indication of text input provided by the first user via the input box of the second reply interface;

determine, based on the text input, a second set of stickers for displaying with the media content item, the second set of stickers being different than the first set of stickers and corresponding to non-avatar based stickers; and cause updated display of the first reply interface by replacing the first set of stickers with the second set of stickers.

10. The system of claim 9, wherein the first set of stickers corresponds to a predefined set of stickers for displaying in a predefined order.

11. The system of claim 9, wherein the first set of stickers corresponds to a subset of stickers randomly selected from among a set of available stickers.

12. The system of claim 9, wherein the instructions further configure system to:

determine a relevancy score for each sticker within the second set of stickers; and order the second set of stickers within the first reply interface based on the determined relevancy scores.

13. The system of claim 9, wherein the instructions further configure system to:

receive user selection of a predefined portion of the first reply interface; and in response to receiving the user selection, activate the first set of stickers for selection by the first user, and display the first set of stickers with an increased opacity.

14. The system of claim 9, wherein the instructions further configure system to:

receive, via the first reply interface, user selection of a sticker within the second set of stickers; and provide for transmission of the selected sticker to the second device.

15. The system of claim 9, wherein the media content item corresponds to a collection of media content items.

16. A non-transitory computer-readable storage medium, the computer-readable storage medium including instructions that when executed by a computer, cause the computer to:

receive, for display on a first device of a first user, a media content item from a second device of a second user, the first and second users being contacts within a messaging system;

determine, in response to receiving the media content item, that the first user has not opted in or otherwise selected an avatar for use within the messaging system;

select, in response to the determining, a first set of stickers for displaying with the media content item, the first set of stickers corresponding to non-avatar based stickers;

cause display of the media content item together with a first reply interface and a second reply interface on the first device, the second reply interface for sending a reply message to the second device, wherein the first reply interface includes the first set of stickers, each of which is selectable by the first user for sending to the second device, and wherein the second reply interface includes an input box for sending message content to the second device;

receive an indication of text input provided by the first user via the input box of the second reply interface;

determine, based on the text input, a second set of stickers for displaying with the media content item, the second set of stickers being different than the first set of stickers and corresponding to non-avatar based stickers; and cause updated display of the first reply interface by replacing the first set of stickers with the second set of stickers.

* * * * *